H. E. FOSTER.
Corn-Planter.

No. 197,352. Patented Nov. 20, 1877.

WITNESSES: INVENTOR:
Hickman E. Foster

UNITED STATES PATENT OFFICE.

HICKMAN E. FOSTER, OF DECATUR, ILLINOIS, ASSIGNOR OF ONE-HALF HIS RIGHT TO RUFUS C. CROCKER, OF SAME PLACE.

IMPROVEMENT IN CORN-PLANTERS.

Specification forming part of Letters Patent No. 197,352, dated November 20, 1877; application filed January 27, 1877.

*To all whom it may concern:*

Be it known that I, HICKMAN E. FOSTER, of Decatur, in the county of Macon and State of Illinois, have invented a new and useful Improvement in Corn-Planters, which improvement is fully set forth in the following specification, reference being had to the accompanying drawings, in which—

Figure 1:
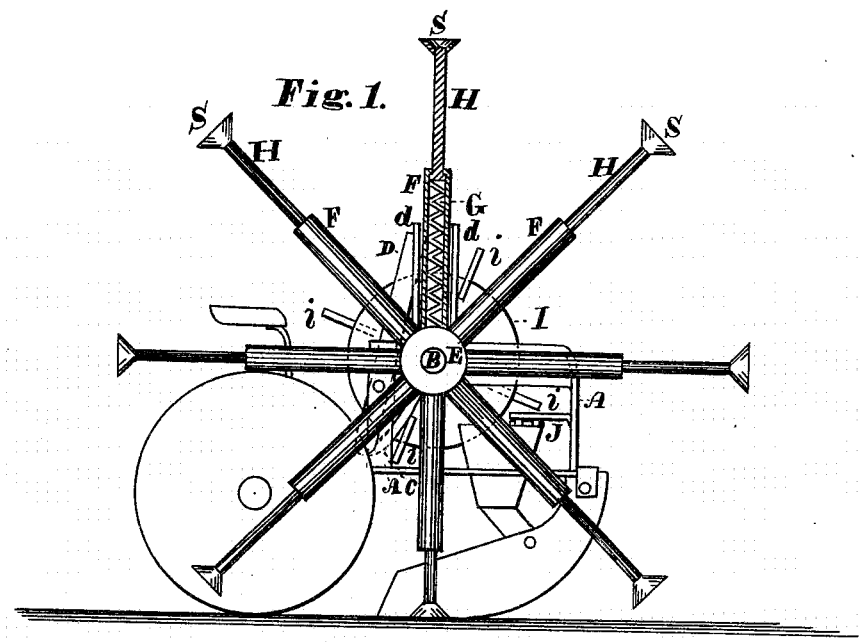
Figure 2:
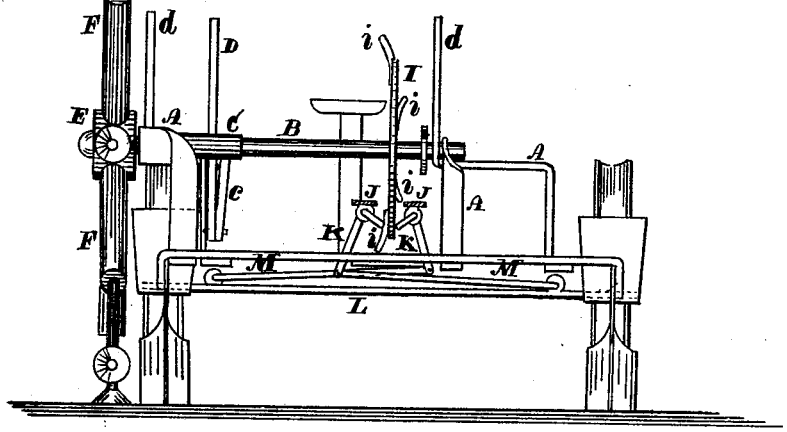

Figure 1 is a side elevation of a corn-planter with my improvement attached, and Fig. 2 is a front elevation of the same.

My invention is an improvement in that class of corn-planters in which a wheel with arms is used to operate the seed-dropping mechanism by the arms striking on the ground; and consists, first, in making the said arms or spokes adjustable to the unevenness of the ground; and, second, in a disk provided with arms, so placed that the arms shall strike alternately on connecting-rod sthat are attached to the seed-slides.

This improvement may be attached to any corn-planter by the supports A A A A. B is a shaft, journaled in these supports. C is a sleeve on the shaft, and attached by the connecting-rod $c$ to the lever D, by which the shaft and mechanism attached thereto can be raised up and locked, when it is desired to turn the planter or to stop the dropping of the corn. $d\ d$ are guides to the shaft when it is raised from its journals.

E is a hub, attached to the shaft B. F are hollow spokes, provided with springs G that throw the rods H out of the spokes. These rods have collars on their ends, and the spokes have shoulders that prevent the rods from coming entirely out of the spokes. S are cup-shaped shovels on the ends of the rods H. These shovels may be made of other shapes, but should be so constructed as to secure a hold on the ground, and at the same time, by means of the cup-shaped shovels or flanges, be prevented from entering the ground too deep—only sufficient so that the shovel shall not slip over the ground.

I is a disk attached to the shaft B, and provided with arms $i\ i\ i\ i$, placed alternately on each side of the disk. J is a support, shown as broken in Fig. 2, and in which is journaled the bent rods K K, the lower end of these rods being connected to the seed-slide L by the rods M M.

The machine operates as follows: As the planter is drawn across the field the shovels or cup-disks on the rods strike the ground, and as the spokes come perpendicular the rods slide up in them. This obviates the difficulty (in using a solid spoke in a wheel for operating the seeding mechanism) of the spokes striking on a clod or stone and raising the machine from the ground and the dropping of the corn "out of check." The springs throw the rods out of the spokes when the shovels are clear of the ground. The contact of the spoked wheel causes the shaft to revolve, and the arms on the disk strike alternately on the bent rods K K and throw the seed-slides from side to side, and at the same time throw the opposite one of the bent rods in position for the succeeding arm on the disk.

Having thus described my invention, what I claim as new, and desire to secure by Letters Patent, is—

1. In a corn-planting wheel, the rod H and spring G, in combination with the hollow spoke, substantially as and for the purpose set forth.

2. The rod H, spring G, and the hollow spoke, in combination with shaft B, disk I, arms $i\ i\ i\ i$, bent rods K K, connecting-rods M M, and seed-slide L, as shown and described.

3. The cup-shaped shovels S, substantially as and for the purpose set forth.

HICKMAN E. FOSTER.

Witnesses:
 THEO. COLEMAN,
 CHAS. M. FLETCHER.